(12) United States Patent
Breyer

(10) Patent No.: US 10,821,621 B2
(45) Date of Patent: Nov. 3, 2020

(54) METHOD AND DEVICE FOR STRIPPING THE INSULATION FROM PRE-INSULATED PIPE CONDUITS

(71) Applicant: Georg Fischer Rohrleitungssysteme AG, Schaffhausen (CH)

(72) Inventor: Markus Breyer, Radolfzell (DE)

(73) Assignee: Georg Fischer Rohrleitungssysteme AG (CH)

( * ) Notice: Subject to any disclaimer, the term of this patent is extended or adjusted under 35 U.S.C. 154(b) by 81 days.

(21) Appl. No.: 16/136,970

(22) Filed: Sep. 20, 2018

(65) Prior Publication Data

US 2019/0105792 A1  Apr. 11, 2019

(30) Foreign Application Priority Data

Oct. 11, 2017 (EP) ..................... 17195949

(51) Int. Cl.
| | |
|---|---|
| *B26D 3/28* | (2006.01) |
| *B26D 3/16* | (2006.01) |
| *B23B 5/16* | (2006.01) |
| *B29L 23/00* | (2006.01) |
| *B23D 21/04* | (2006.01) |
| *B26D 1/36* | (2006.01) |

(52) U.S. Cl.
CPC .............. *B26D 3/282* (2013.01); *B23B 5/162* (2013.01); *B26D 3/16* (2013.01); *B26D 3/166* (2013.01); *B23B 2215/72* (2013.01); *B23B 2228/36* (2013.01); *B23D 21/04* (2013.01); *B26D 1/36* (2013.01); *B29L 2023/225* (2013.01)

(58) Field of Classification Search
CPC ..... Y10T 83/04; Y10T 83/384; Y10T 83/385; Y10T 83/386; Y10T 83/387; B23D 21/04; B23D 21/00; B26D 3/282; B26D 3/16; B26D 3/166; B26D 1/36; B23B 5/162; B23B 5/12; B23B 5/161; B23B 5/163; B23B 1/00; B23B 2215/72; B23B 2228/36; B23C 3/122; B23C 3/124; B23C 1/00; B29L 2023/225
USPC .................................... 81/9.4, 9.51
See application file for complete search history.

(56) References Cited

U.S. PATENT DOCUMENTS

| | | | |
|---|---|---|---|
| 10,035,194 B2 * | 7/2018 | Hunnekuhl | B23D 21/006 |
| 2011/0041658 A1 * | 2/2011 | Weinberg | B23B 5/162 |
| | | | 82/113 |
| 2017/0252831 A1 | 9/2017 | Hunnekuhl et al. | |

FOREIGN PATENT DOCUMENTS

| | | |
|---|---|---|
| DE | 4409438 C1 | 7/1995 |
| DE | 29516513 U1 | 1/1997 |
| EP | 0281764 A2 | 9/1988 |
| EP | 3213890 A1 | 9/2017 |

(Continued)

OTHER PUBLICATIONS

Georg Fischer Rohrleitungssysteme AG: Bedienungsanleitung Cool-Fit 2.0/2.0M + 4.0—Abisolier—und Schälwerkzeug d32-d90/d-110-d225, (with English translation), Jan. 2018 (44 pages).

(Continued)

*Primary Examiner* — Phong H Nguyen
(74) *Attorney, Agent, or Firm* — Harness, Dickey & Pierce, P.L.C.

(57) ABSTRACT

A method and device for stripping the insulation from and peeling pre-insulated pipe ends by means of a peeling and cutting tool.

7 Claims, 11 Drawing Sheets

(56) References Cited

FOREIGN PATENT DOCUMENTS

JP    57-163525 A    10/1982

OTHER PUBLICATIONS

"Cool-FIT2.0 foam removal and peeling tool—GF Piping Systems—English" YouTube video: https://www.youtube.com/watch?v=26zyf2GHM6w, Published Aug. 2017.

\* cited by examiner

METHOD AND DEVICE FOR STRIPPING THE INSULATION FROM PRE-INSULATED PIPE CONDUITS

CROSS-REFERENCE TO RELATED APPLICATIONS

This application claims the benefit and priority of EP 17 195 949.7 filed Oct. 11, 2017. The entire disclosure of the above application is incorporated herein by reference.

BACKGROUND OF THE INVENTION

Technical Field

The invention relates to a method and a device for stripping the insulation from and peeling pre-insulated pipe ends by means of a peeling and cutting tool, wherein the method has the following steps:
- clamping the peeling and cutting tool on the inside diameter of the medium-carrying pipe by means of a clamping unit,
- severing the pipe jacket along the outer circumference thereof and simultaneously cutting into the insulating layer by means of a cutting device arranged on a support arm, wherein the support arm is rotated about a guide unit arranged coaxially with the clamping unit,
- removing the pipe jacket,
- separating the insulating layer from the outer circumferential surface of the medium-carrying pipe by means of a separating unit, wherein the separation is produced by a rising rotary motion of the separating unit about the guide axis or pipe axis, starting from the pipe end face and proceeding as far as a predetermined pipe length or end position,
- removing the separated insulating layer from the medium-carrying pipe,
- peeling and removing the oxide layer of the outer circumferential surface of the medium-carrying pipe by means of a peeling unit, wherein peeling takes place in the same or in the opposite direction of rotation and rising as/from the separating process, starting from the end position of the predetermined pipe length or the end face of the pipe.

Discussion

This invention relates to a tool and an associated method which is used for pre-insulated pipe conduits. Such pre-insulated pipe conduits are used where there is a need for good insulation of the medium relative to the ambient conditions, e.g. for the transportation of refrigerants in cooling systems. Arranged around the inner pipe carrying the medium or medium-carrying pipe, preferably made of plastic, there is an insulating layer, preferably made of foamed plastic, wherein the insulating layer is surrounded by an external skin or pipe jacket, which is preferably formed from plastic but, alternatively, from a metal and serves to protect the insulating layer. To enable such pipe conduits to be connected to fittings or additional pipes, the insulation must be removed from the ends thereof and the medium-carrying pipe must be peeled at the outer circumferential surface since the connection takes place via the medium-carrying pipe in order to ensure leak-tightness.

The prior art includes tools of this kind for peeling and cutting but these are only for pipes which, although having multiple layers, do not have an insulating layer.

DE 295 16 513 U1 discloses a tool of this kind, wherein said tool is suitable only for pipes with a plurality of jacketing layers but not for insulating layers.

Pre-insulated pipes have hitherto generally been stripped of insulation and prepared for connection manually without an appropriate tool which carries out all the steps, such as stripping the insulation from and peeling of the medium-carrying pipe. Thus, the insertion depth was first of all measured in order to determine to what extent the insulating layer and the outer pipe must be removed. The outer pipe was then cut off, followed by the insulating layer. In order to ensure a good surface for welding the exposed medium-carrying pipe, e.g. to a fitting to be welded thereto, the outer surface of the medium-carrying pipe also had to be peeled.

Apart from the disadvantage of the large number of individual steps to be carried out, there is also the major disadvantage of a frequent source of errors. Owing to the manual measurement of the insertion depth which has to be stripped of insulation, it is quite possible that an error will occur during this process, as also during the removal of the insulating layer, which can also cause unintentional damage to the medium-carrying pipe.

EP 3 213 890 A1 shows a peeling and cutting tool which is suitable for stripping the insulation from pre-insulated pipe conduits, wherein this is only suitable for pipe conduits up to a certain pipe diameter. This tool cannot be used for larger pipe conduits since, at large diameters, stripping the insulation and simultaneously peeling the medium-carrying pipe is not possible; owing to the high pressure under the insulation material, it would not be possible to move the blade. Even if the steps of stripping the insulation or removing the insulating layer from the medium-carrying pipe and peeling take place separately, the pressure under the insulating layer is nevertheless too high to carry out a separating process in the case of large dimensions.

It is the object of the invention to propose a method and an associated device which make it possible, in as short as possible a time, to strip the insulation from pre-insulated pipe conduit ends of large dimensions or to reduce the high pressure under the insulating layer to enable the insulating layer to be detached from the medium-carrying pipe, using a manually actuable device.

According to the invention, this object is achieved by virtue of the fact that, before the pipe jacket is severed along the circumference, the pipe jacket is cut open and the insulating layer is cut into parallel to the pipe axis, preferably starting from the end face of the pipe and proceeding as far as a predetermined pipe length.

This is also achieved, inter alia, by virtue of the fact that a threaded segment which projects through the guide sleeve is arranged adjustably in a fixing ring surrounding the guide sleeve, said segment engaging with the spindle and bringing about a feed motion or not engaging, depending on its position. This makes it possible for the different method steps to be carried out with one tool during the entire insulation stripping and peeling process.

SUMMARY OF THE INVENTION

The method according to the invention for stripping the insulation from and peeling pre-insulated pipe ends, in particular from pipe conduits with an inside diameter of the medium-carrying pipe of at least 110 mm, by means of a peeling and cutting tool, preferably has the following steps:

The peeling and cutting tool is clamped on the pipe end by means of a clamping unit arranged on the peeling and cutting tool, wherein the clamping unit is clamped centrally on the inside diameter of the medium-carrying pipe. The clamping unit together with the guide unit arranged thereon can preferably be clamped separately on the medium-carrying pipe first of all, and the remainder of the peeling and cutting tool is then pushed onto the guide unit. In order to reduce the high pressure under the insulating layer, a radial cut is made, said cut extending parallel along the pipe axis and cutting open the pipe jacket and cutting into the insulating layer during the same cut, preferably starting from the end face of the pipe end and proceeding as far as a predefined pipe length or end position. It is advantageous if the predefined pipe length or end position is defined by an end stop, wherein this end stop is preferably predetermined by the separating unit or the width thereof.

By means of the cutting device arranged on the peeling and cutting tool or on the support arm, the pipe jacket surrounding the insulating layer is then severed along the circumference, and, in addition, the insulating layer is cut into.

The severing of the outer pipe jacket and the cut into the insulating layer are performed along the circumference of the pipe jacket by means of a cutting device arranged on a support arm, wherein the support arm is rotated about the guide unit, which is arranged coaxially with the clamping unit.

The incision previously extending parallel to the pipe axis or the cutting open of the pipe jacket and the insulating layer is preferably carried out by means of the same cutting device as that used to sever the pipe jacket along the circumference thereof. To carry out the cutting-open process, the threaded segment is arranged in such a way that it does not engage with the guide unit or spindle and, as a result, the peeling and cutting tool can be moved axially along the guide unit as far as the end stop with the aid of the guide sleeve.

The guide unit is arranged coaxially in front of the clamping unit and connected to the latter, wherein a bearing assembly of the support arm is arranged on the guide unit, preferably on the guide sleeve arranged on the guide unit, and thus the support arm and the units or devices secured thereon are enabled to perform the rotary motion about the pipe end. Following the severing process, the severed pipe jacket is removed from the insulating layer.

The separating of the insulating layer from the outer circumferential surface of the medium-carrying pipe is implemented by a rising rotary motion of the separating unit about the pipe axis or about the guide unit, which is designed as a spindle, wherein the separation takes place starting from the end face of the pipe and proceeding as far as a predetermined pipe length or end position. The separating unit is preferably arranged on the guide sleeve, which, in turn, is connected to the support arm, as a result of which the manual rotation of the support arm transmits the rotary motion to the separating unit. By means of the blade arranged on the separating unit, which can preferably be mounted on the separating unit simply by being pushed on and which pierces the insulating material at the end face, just above the outer circumferential surface of the medium-carrying pipe, and by means of a rotary motion which rises, the insulating layer is separated from the medium-carrying pipe. The separating process begins at the end face of the pipe end and extends as far as an end position over a predefined pipe length.

The peeling and cutting tool preferably has a corresponding end stop, which determines the predefined pipe length and thus the end position.

It has proven advantageous if the end stop is formed by the separating unit since said unit is to be selected in accordance with the pipe diameter and to be provided on the peeling and cutting tool, and the predefined pipe length which is to be stripped of insulation can be associated with the corresponding pipe diameter. Thus, the corresponding separating unit has the required width and the blade length corresponding to the diameter of the pipe. By means of this coordination of the separating unit with a predefined length of the insulation stripping depth in relation to the pipe diameter, it is possible to avoid errors, and separate measurements are also eliminated.

The separated insulating layer must then be removed from the medium-carrying pipe. During this process, the peeling and cutting tool is preferably situated in the end position, i.e. the separation of the insulating layer from the circumferential surface of the medium-carrying pipe has resulted in the peeling and cutting tool being moved over the predefined pipe length into the end position by means of the guide unit, wherein the guide unit is preferably designed as a spindle.

After the removal of the insulating layer, the peeling process is performed on the medium-carrying pipe or the outer circumferential surface thereof, for which purpose the peeling unit arranged on the peeling and cutting tool is used. The peeling process serves primarily to remove the oxide layer on the circumferential surface of the medium-carrying pipe in order then to ensure a good surface finish of the outer circumferential surface, which is decisive for further use, e.g. welding by means of arc-weld fitting.

The peeling unit is preferably arranged on the support arm and is interchangeable with the cutting device. The peeling process on the outer circumferential surface of the medium-carrying pipe takes place in the same or in the opposite direction of rotation and rising as/from the separating process, starting from the end position of the predetermined pipe length or the end face of the pipe.

It is advantageous if the radial cut or the cut extending parallel to the pipe axis is implemented with the same cutting device as that with which the severing cut extending along the circumference of the pipe jacket is performed, wherein, after the cutting-open process parallel to the pipe axis, the cutting device is preferably rotated through 90° about a centre of rotation in order to perform the severing cut along the circumference.

To ensure the 90° rotation, the cutting device preferably has a joint which enables the cutting edge of the cutting tool to be rotated through 90°. This enables the radial cutting of the pipe jacket and the severing cut along the circumference of the pipe jacket to be performed with the same cutting tool and the same cutting device.

During the entire insulation stripping process, the clamping and guide unit remains on the pipe end or on the inside diameter of the medium-carrying pipe, whereas the remainder of the peeling and cutting tool can be removed from the guide unit between the severing process and the separation process to allow conversion and better access to the pipe layer to be removed. There is also the possibility of leaving the support arm on the guide unit and only removing the peeling unit or cutting device from the support arm or, in the case of a relevant method step, mounting it on the support arm, and of arranging the blade of the separating unit on the separating unit only during the separating process.

According to a preferred embodiment, the separating unit can optionally be connected for conjoint rotation to the support arm, or the support arm can be arranged or mounted in such a way as to be rotatable relative to the separating unit, in accordance with the processing step to be performed. As already mentioned, the separating unit is preferably arranged on a guide sleeve, wherein the bearing assembly of the support arm is likewise preferably arranged on this guide sleeve. By virtue of the fact that the support arm is arranged on a bearing assembly, it can optionally be rigidly connected to the guide sleeve by disabling the bearing assembly or the rotary function thereof, or the bearing assembly is released or the rotary function is allowed to enable the support arm to be rotated about the guide sleeve by means of the bearing assembly.

The desired function of the support arm is dependent on the method step which is to be carried out at any particular time. This means that, during the radial cut or the process of cutting open taking place parallel to the pipe axis, the support arm or bearing assembly is free or not blocked, even if no rotation takes place in this method step, the spindle together with the guide sleeve serves as a linear guide, since the guide sleeve rests on the outside diameter of the spindle until the axial end position has been reached. In order to allow the severing of the pipe jacket along the circumference, the bearing assembly remains enabled or the latching remains released, thereby allowing the support arm to be rotated about the guide sleeve.

It has also proven advantageous if the peeling unit on the support arm can be replaced by the cutting device and the exchange takes place when the support arm is not arranged on the guide unit, wherein the exchange can also take place while the support arm is secured on the guide unit.

The cutting unit is preferably dismounted from the support arm in order to remove the pipe jacket and to carry out the separating process by means of the separating unit between the outer circumferential surface of the medium-carrying pipe and the insulating layer. As already mentioned above, this is achieved by the support arm being connected for conjoint rotation to the guide sleeve by disabling the bearing arrangement by means of fixing means, as a result of which the separating unit, which is likewise arranged on the guide sleeve, is simultaneously rotated when the support arm is manually actuated or rotated about the guide unit. Of course, the peeling unit could already be mounted on the support arm in this step, but, owing to the greater ease of actuation, it is preferably secured on the support arm only after the separating process. For the separation of the insulating layer, the separating unit has a blade, which is mounted on the separating unit and can easily be removed again so that the separating unit itself can remain on the peeling and cutting tool, since it also serves as an end stop, but the blade is not required in the other method steps.

In order to transmit the rise of the guide unit or spindle to the guide sleeve and also to the separating unit, a threaded segment projects into the guide sleeve, said segment being arranged in a fixing ring which surrounds the guide sleeve, the clamping and release of the threaded segment being made possible by the internal shaping of an eccentric. If the threaded segment is pressed against the spindle by way of the guide sleeve by means of the eccentric, the threaded segment engages with the spindle, as a result of which a feed motion or a linear movement of the separating unit and of the support arm or of the peeling and cutting tool is implemented when the support arm is rotated. If the fixing ring is released by rotation and thus also rotation of the eccentric or of the eccentric recess, the threaded segment moves back outwards, or springs push it outwards, and the threaded segment no longer engages with the spindle, and a feed motion due to the thread pitch can no longer take place.

Here too, as already during the severing process, the separating unit or the width of the separating unit preferably serves as an end stop for the desired pipe length from which there is a need to strip insulation.

The peeling and cutting tool according to the invention for stripping the insulation from and peeling pre-insulated pipe ends, comprises a clamping unit for the central holding of the medium-carrying pipe end, a guide unit, wherein the guide unit is designed as a spindle and serves to provide the feed motion during the separating and peeling process, and wherein the guide unit is arranged coaxially in front of the clamping unit. Moreover, the peeling and cutting tool has a support arm, wherein the support arm is mounted on a guide sleeve by means of a bearing assembly, and wherein the guide sleeve is arranged on the guide unit. The peeling and cutting tool likewise has a separating unit, which serves to separate the insulating layer from the outer circumferential surface of the medium-carrying pipe, and a cutting device, which serves to sever the pipe jacket and to cut into the insulating layer, and a peeling unit, which is used for the subsequent peeling and removal of the oxide layer on the outer circumferential surface of the medium-carrying pipe. The cutting device and the peeling unit are preferably arranged interchangeably on the support arm.

A threaded segment is arranged adjustably in the guide sleeve, which is arranged on the spindle, said segment engaging with the spindle and bringing about a feed motion or not engaging, depending on its position. As already mentioned, different settings of the support arm and of the bearing assembly thereof and also of the guide sleeve are required for the different method steps during the insulation stripping process. This means that the threaded segment arranged in the guide sleeve engages with the spindle in one position and, as a result, is used as a guide with an axial feed motion during the separating process and also during the peeling process. When the threaded segment is not in engagement with the spindle and the guide sleeve and the complete peeling and cutting tool does not undergo any axial movement, this setting or arrangement of the threaded segment in the guide sleeve is used for the severing process since, in that case, no feed motion is required but a rotary motion with the support arm is nevertheless carried out. In order to make this possible, the bearing assembly of the support arm is, as already mentioned, set to the released state by means of the fixing means, thus enabling the support arm to rotate about the guide sleeve. Despite the fact that no feed motion is required, the threaded segment is nevertheless preferably pressed onto the spindle by means of the fixing ring during this method step in order to achieve clamping of the guide sleeve with the aid of the end stop, as a result of which the guide sleeve is fixed axially and radially. During the radial cut parallel to the pipe axis to open up the pipe jacket and simultaneously cut into the insulation, which is to be carried out before this, the threaded segment is not in engagement with the spindle, however, as a result of which there is an axial movement of the support arm along the spindle, which then serves as a linear guide for the guide sleeve.

An illustrative embodiment of the invention is described by means of the figures, although the invention is not restricted only to the illustrative embodiment.

DRAWINGS

FIG. 1 shows a front view of a peeling and cutting tool according to the invention with a clamped cutting device, FIG. 2 shows a side view of a peeling and cutting tool according to the invention with a clamped cutting device, FIG. 3 shows a plan view of a cutting device, FIG. 4 shows a front view of a peeling and cutting tool according to the invention with a clamped peeling unit, FIG. 5 shows a longitudinal section through the bearing assembly of the support arm, FIG. 6 shows a cross section through the fixing ring, FIG. 7 shows a cross section through the support arm;

DETAILED DESCRIPTION OF THE PREFERRED EMBODIMENTS

Figure 1:
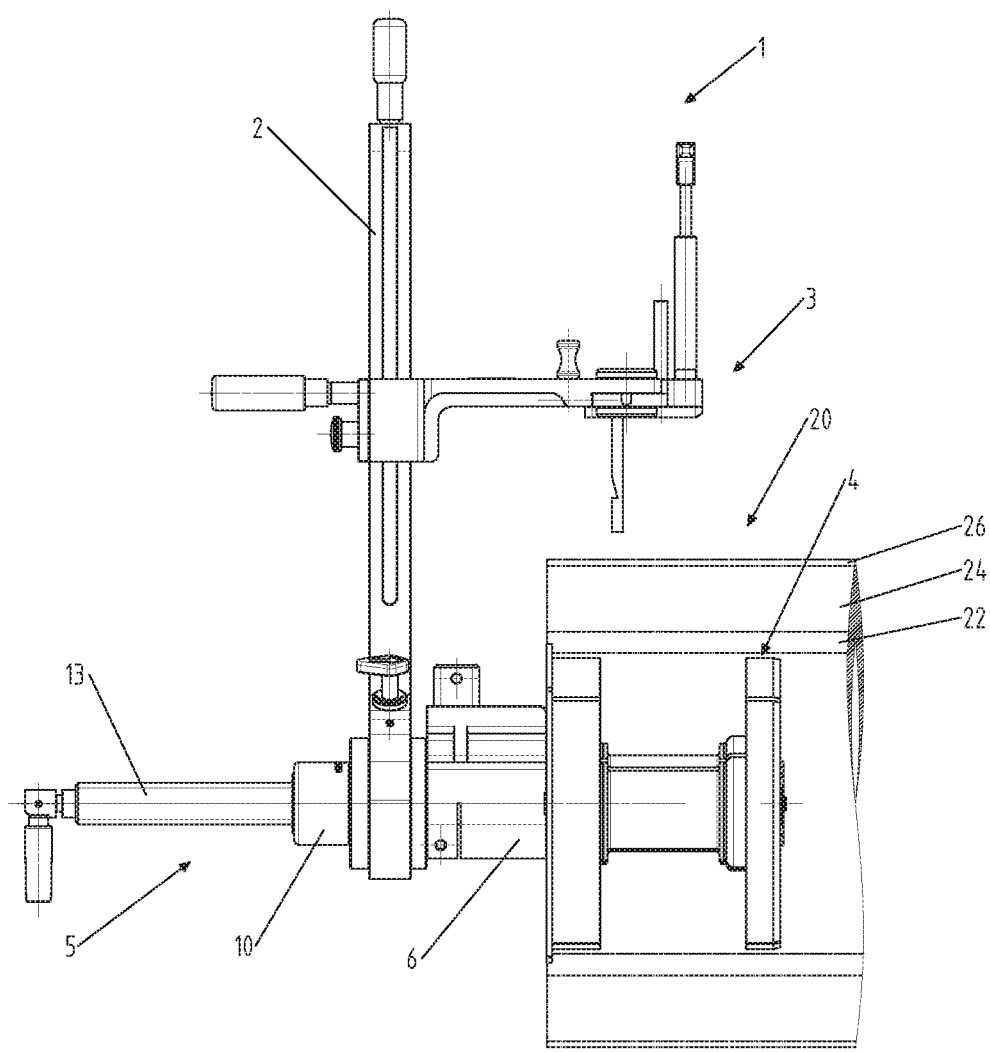

The drawing shown in FIG. 1 shows a front view of a peeling and cutting tool 1 according to the invention for stripping the insulation from and peeling pre-insulated pipe ends 20. The pipe end 20 includes a medium carrying pipe 22 surrounded by an insulation layer 24 and an outer pipe jacket 26. The clamping unit 4 serves to clamp the peeling and cutting tool 1 on the inside diameter of the medium-carrying pipe 22. The clamping unit 4 allows central holding of the medium-carrying pipe 22, which is essential during the peeling of the outer circumferential surface and the removal of the oxide layer on the medium-carrying pipe 22 at the end of the insulation stripping process in order to ensure a peeled surface at all points.

Figure 2:
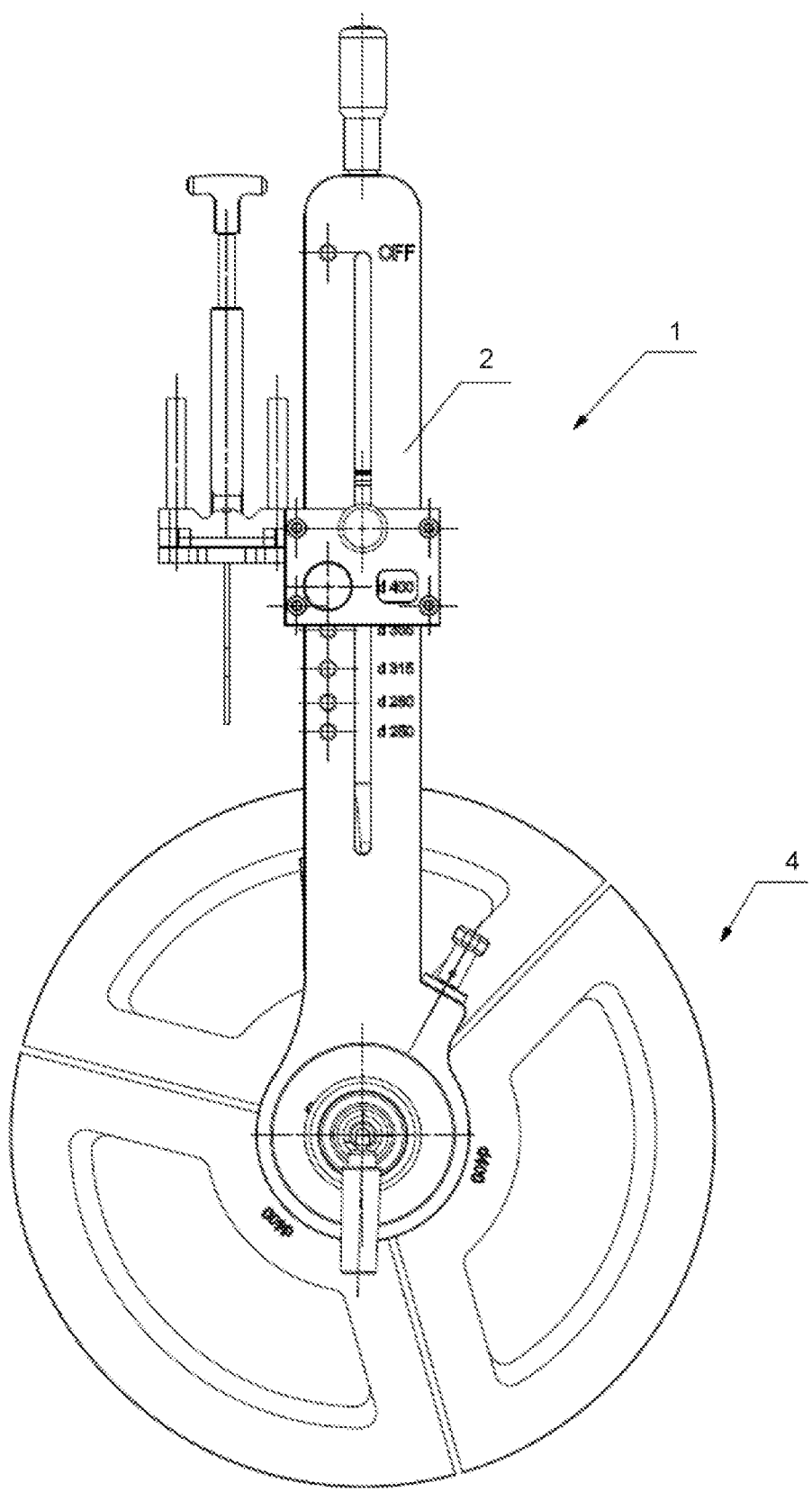
Figure 3:
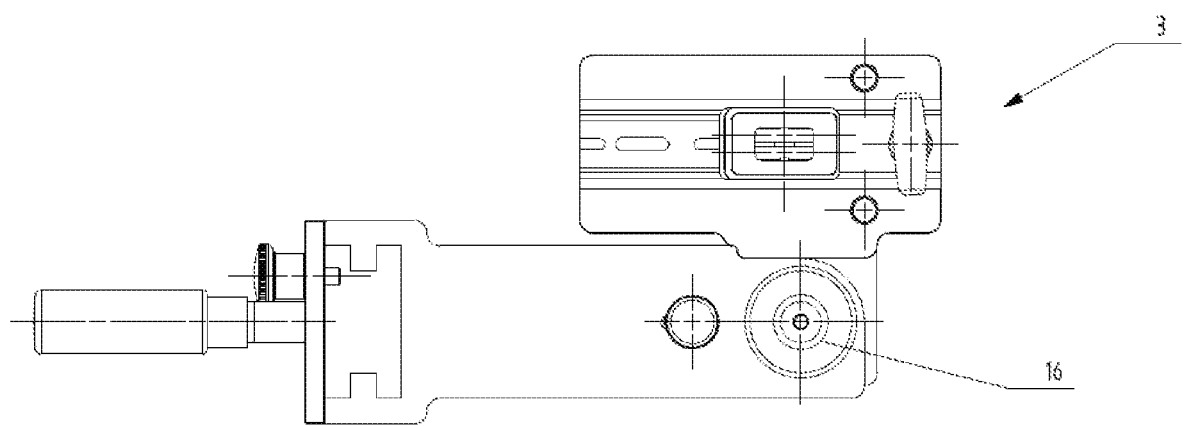
Figure 8:
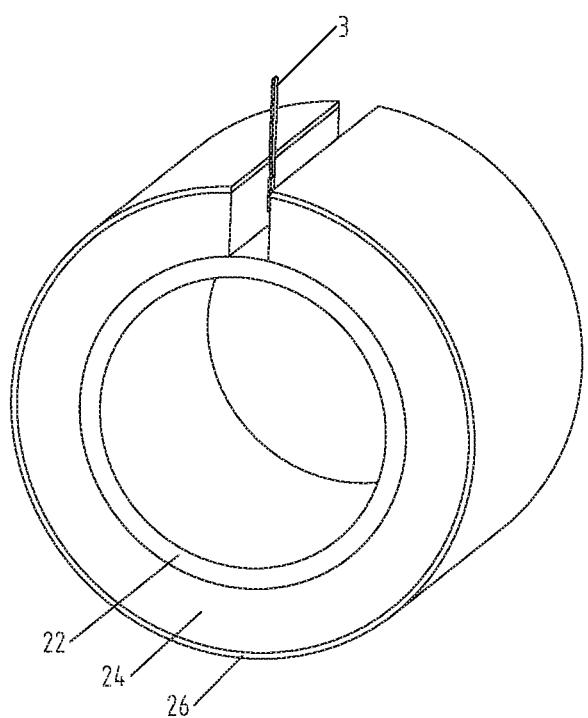
FIG. 8 is a perspective view showing the pipe jacket and insulation being cut parallel to the pipe axis.
Figure 9:
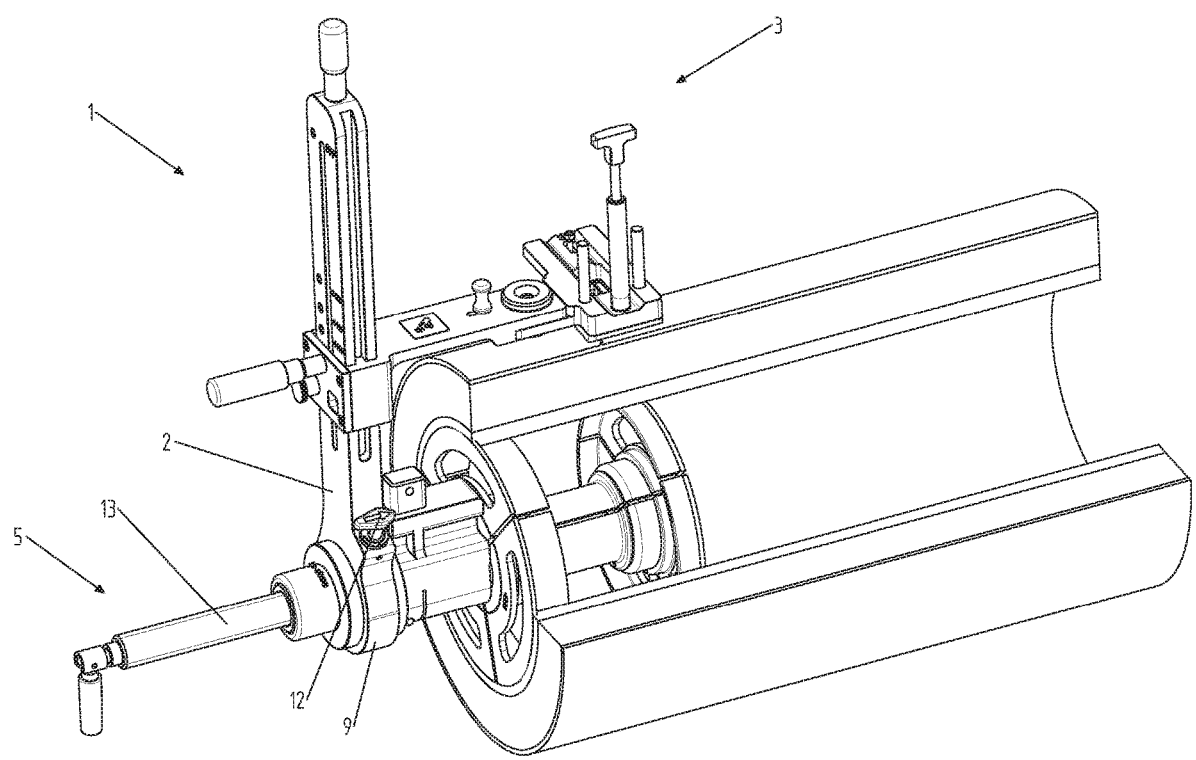
FIG. 9 is a perspective view of a severing unit.
Figure 10:
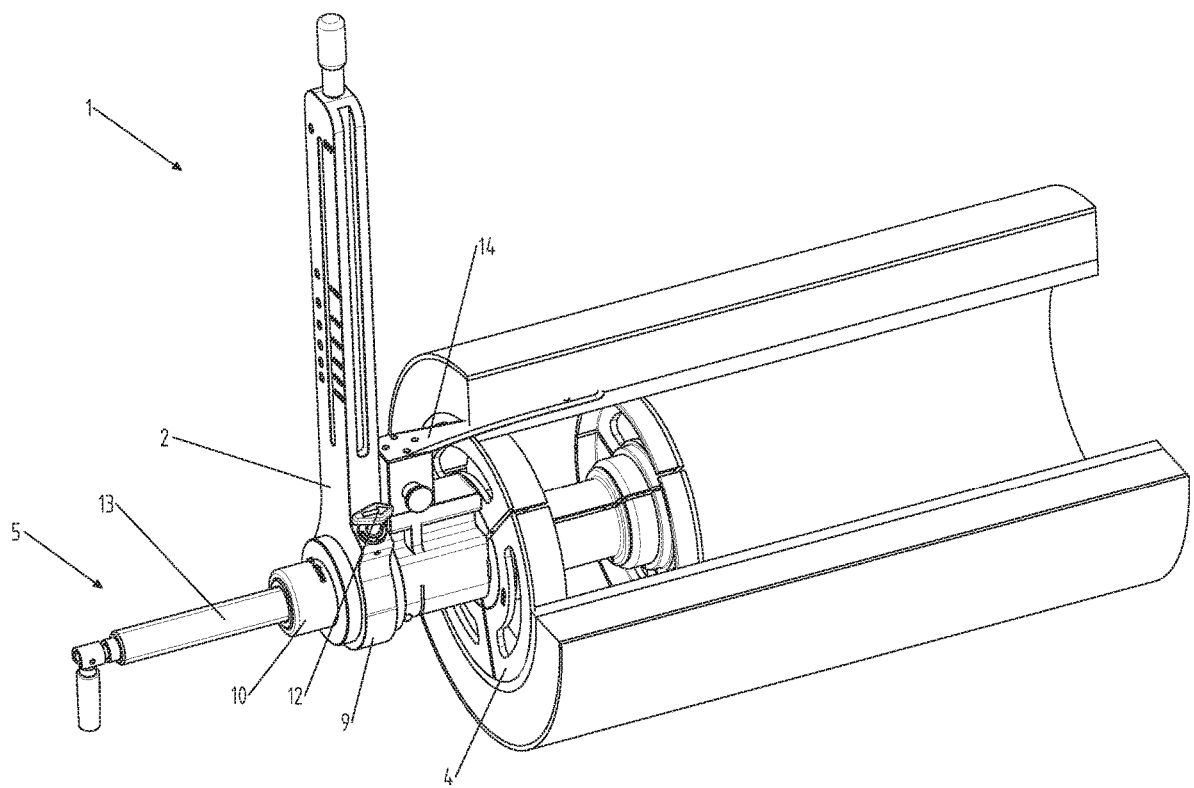
FIG. 10 is a perspective view of a separating unit.
Figure 11:
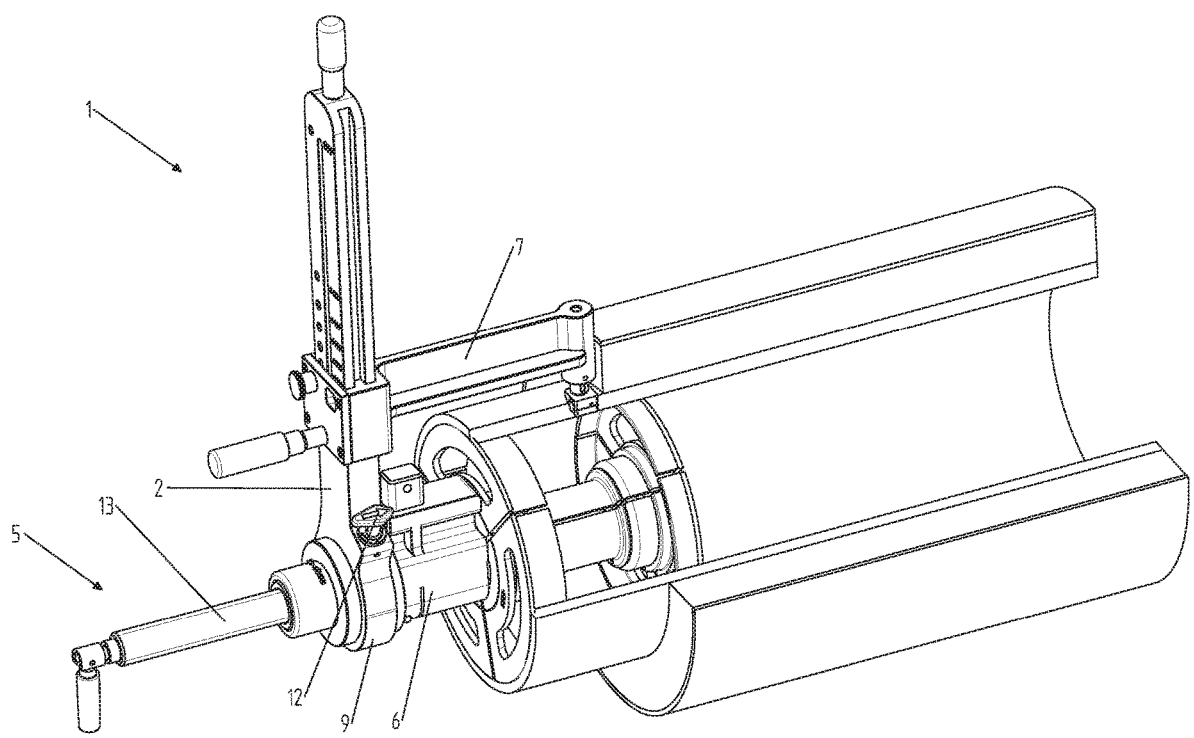
FIG. 11 is a perspective view of a peeling unit.

Arranged coaxially in front of the clamping unit 4 is the guide unit 5, which is firmly connected to the clamping unit 4 and serves to guide the peeling and cutting tool 1 or the support arm 2 and the associated devices 3 and units 6, 7. By means of the clamping unit 4, the peeling and cutting tool 1 is first of all secured on the inside diameter of the medium-carrying pipe 22 as shown in FIG. 1, preferably only the clamping unit 4 with the guide unit 5 arranged thereon being secured on the pipe end 20 and then the support arm 2 with the bearing assembly 9, the guide sleeve 8 and the separating unit 6 and preferably the cutting device 3 being mounted. The guide sleeve 8 is guided along the spindle 13. A radial cut parallel to the pipe axis is preferably introduced into the pipe end first of all, preferably by means of the cutting device 3 having a blade, wherein this could also be carried out as a separate cut with a different tool. FIG. 8 shows a cut through both the pipe jacket 26 and insulation layer 24. Once the predefined pipe length to be stripped of insulation has been achieved, the cutting device 3 is realigned, i.e. rotated by 90° about a centre of rotation. This is preferably achieved by means of a joint 16, as a result of which the cutting device 3 is pivotable, as can be clearly seen from FIG. 3. The predefined pipe length is formed by an end stop, thereby eliminating the need to measure the length to be stripped of insulation. The separating unit 6 is preferably used as an end stop, which strikes against the clamping unit 4 when the length has been reached. By means of the cutting device 3, the pipe jacket 26 which surrounds the insulating layer 26 is then severed, and the insulating layer 24 is also cut into. Severing takes place along the pipe circumference when the peeling and cutting tool 1 is in the end position. For this purpose, the tool 1 is clamped by means of the fixing ring 10, which presses the threaded segment 11 onto the spindle 13, and by the contact of the end stop with the clamping unit at the end face. The fixing means 12 is set in such a way that the bearing assembly 9 is free and the support arm 2 with the cutting device 3 arranged thereon can be rotated. After a full rotation, the support arm 2 with the cutting device 3 arranged thereon is preferably removed from the guide unit 5 in order then to detach the pipe jacket 26, which has been completely severed, from the insulating layer 24, wherein the tool can also remain on the guide unit 5 in order to remove the pipe jacket 26. FIG. 2 shows the tool 1 according to the invention, in which the setting on the support arm 2 of the devices and units with reference to the pipe diameter to be processed is clearly visible.

Figure 4:
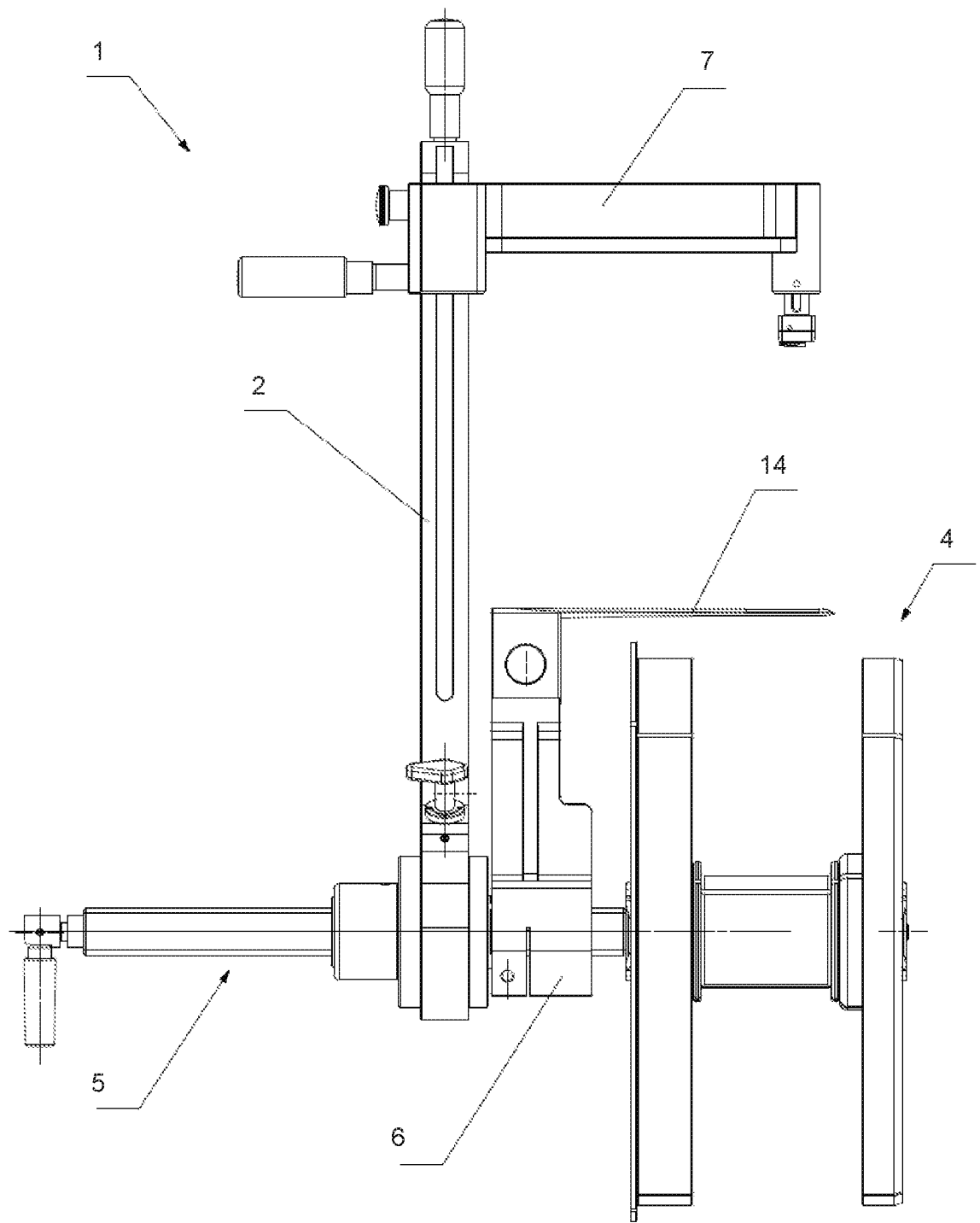
Figure 5:
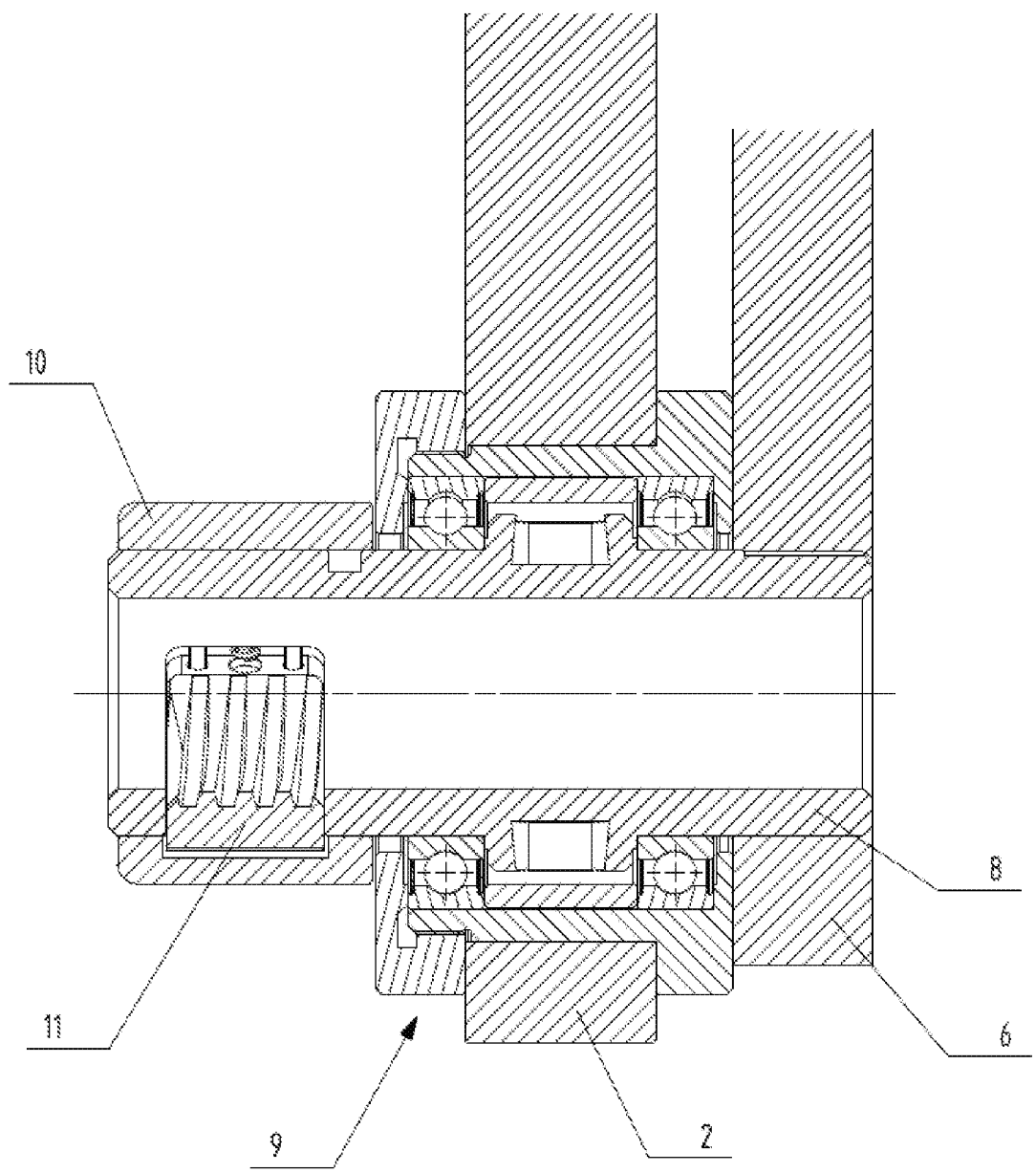
Figure 6:
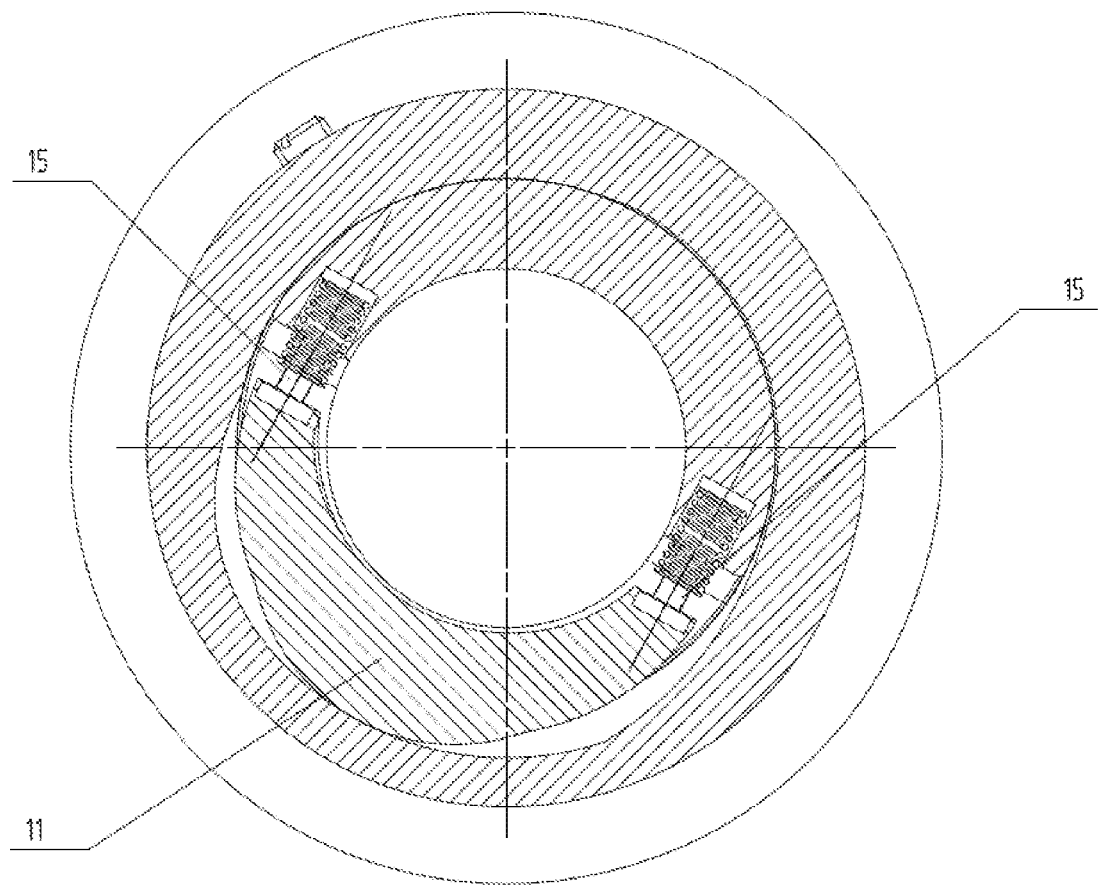

The cutting device 3 is preferably exchanged with the peeling unit 7 when the support arm 2 or the peeling and cutting tool 1 is not arranged on the guide unit 5, wherein exchange is also possible when the tool 1 is mounted on the guide unit 5. FIG. 4 shows the peeling and cutting tool with the peeling unit 7 arranged on the support arm 2, the peeling unit having been exchanged with the cutting device 3. Moreover, the blade 14 has been mounted on the separating unit 6 in order to carry out the separation of the insulating layer from the medium-carrying pipe. To separate the insulating layer from the outer circumferential surface of the medium-carrying pipe, the threaded segment 11 is pressed against the spindle 13, counter to the springs 15 or spring force, which would otherwise press the threaded segment 11 outwards, by rotating the fixing ring 10 and the eccentric arranged therein or the recess designed as an eccentric, as can be seen in FIG. 6. This ensures that the threaded segment 11 engages with the spindle 13 and a feed motion is implemented during the rotation of the guide sleeve 8 or of the support arm 2, which is firmly connected to the guide sleeve 8 by way of the fixing means 12. As a result, the peeling and cutting tool 1 moves along the spindle 13, with the result that the blade 14 arranged on the separating unit 6 penetrates at the end face between the outer circumferential surface of the medium-carrying pipe and the insulating layer 24 and, by virtue of the rising rotary motion of the separating unit and of the peeling and cutting tool, separates the insulating material 24 from the medium-carrying pipe 22 along the predetermined pipe length. Once the end position has been reached, the insulating layer 24 is removed from the medium-carrying pipe. Since the outer circumferential surface of the medium-carrying pipe must still be peeled and the oxide layer removed to allow further use, e.g. welding or adhesive bonding, the peeling unit 7 has already been secured beforehand on the support arm 2, although it is also possible to secure the peeling unit 7 on the support arm 2 only after the separation of the insulating layer, which facilitates the rotation of the separating unit 6 during the separating process. Peeling of the outer circumferential surface of the medium pipe 22 is implemented by means of a peeling unit 7 arranged on the support arm 2, wherein the peeling process can be carried out in the same or in the opposite direction of rotation and feed or direction of rise as/to the separating process.

In order to facilitate the rotation of the support arm 2, especially during the separating process, the peeling and cutting tool has a ratchet function, thereby enabling the support arm 2 to be rotated in steps.

Figure 7:
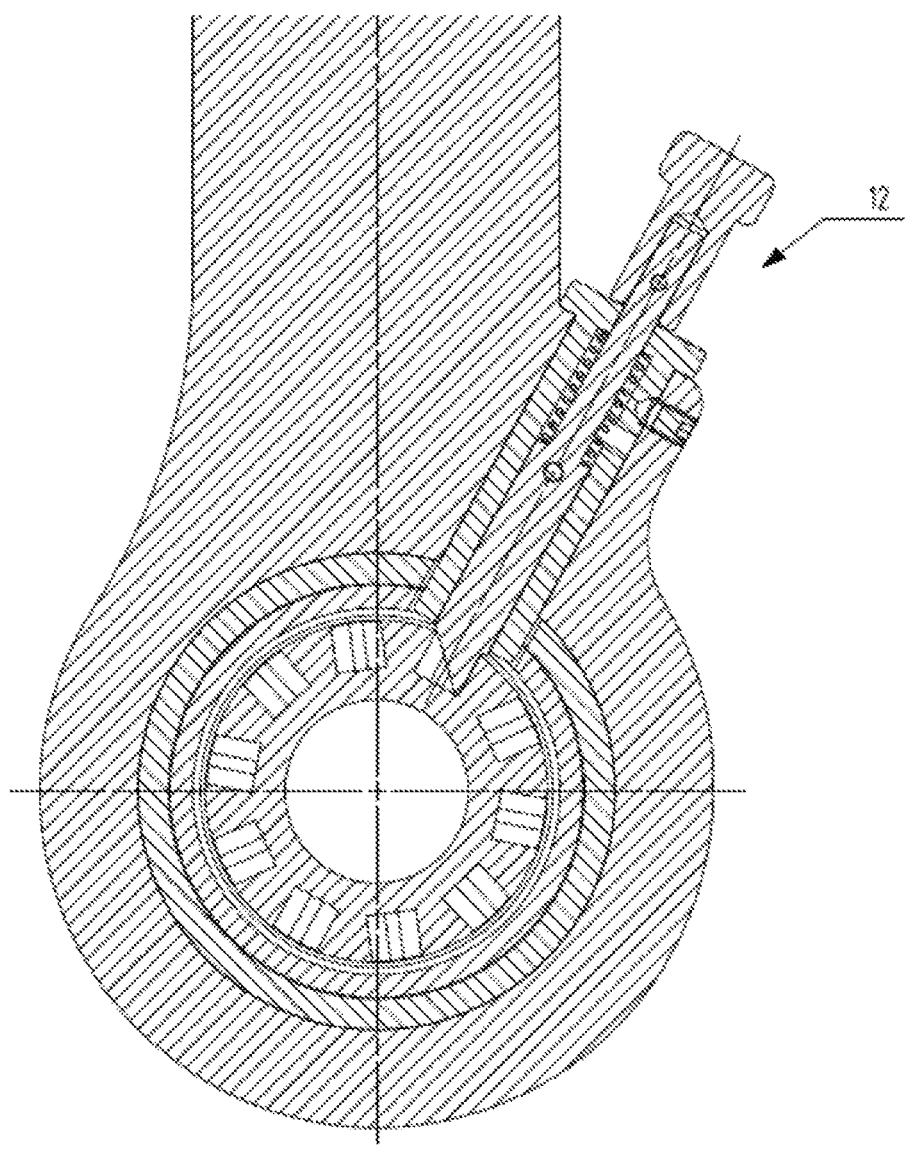

FIG. 7 shows a cross section through the fixing means 12, which, on the one hand, allows locking of the bearing assembly 9 to the support arm 2 as well as the release of the bearing assembly 9 to enable the support arm 2 to be rotated freely about the guide sleeve. However, the depressions along the circumference of the guide sleeve 8 and the spring action of the fixing means 12 furthermore allow a ratchet function, which is intended to provide support in the case of the application of a large force.

What is claimed is:

1. A method for stripping an insulation from and peeling pre-insulated pipe ends by means of a peeling and cutting tool, the method comprising:

clamping the peeling and cutting tool on the inside diameter of the medium-carrying pipe by means of a clamping unit, the medium-carry pipe being surrounded by an insulation layer and an outer pipe jacket, making at least one cut through the pipe jacket and through the insulation layer parallel to the longitudinal axis of the medium-carrying pipe thereafter, severing the pipe jacket along the outer circumference thereof and simultaneously cutting into the insulating layer by means of a cutting device arranged on a support arm, wherein the support arm is rotated about a guide unit arranged coaxially with the clamping unit, and separating the pipe jacket and insulating layer from the outer circumferential surface of the medium-carrying pipe by means of a separating unit, removing the separated pipe jacket and insulating layer from the medium-carrying pipe, peeling and removing an oxide layer of the outer circumferential surface of the medium-carrying pipe by a peeling unit, wherein, the cut through the pipe jacket and insulating layer reduces pressure on the insulating layer to facilitate separating the insulating layer from the medium-carrying pipe; and wherein the separating unit is optionally connected for conjoint rotation to the support arm and is rotated jointly about the axis of the guide unit, or the separating unit is mounted in such a way as to be rotatable relative to the support arm about the axis of the guide unit, and the separating unit is not simultaneously rotated as the support arm is rotated, wherein the setting of the separating unit with the support arm is chosen in accordance with the processing step to be carried out.

2. The method according to claim 1, wherein the cut in the jacket pipe and the insulating layer, which cut extends parallel to the pipe axis, is performed by means of the same cutting device as the severing cut along the circumference.

3. The method according to claim 2, wherein after cutting open the jacket pipe and cutting into the insulating layer, the cutting device is rotated by 90° about a centre of rotation in order to perform the severing cut along the circumference.

4. The method according to claim 1, wherein the clamping unit, together with the guide unit arranged coaxially in front of said unit, is not detached from the medium-carrying pipe, or remains on the medium-carrying pipe, during the entire insulation stripping process.

5. The method according to claim 1, wherein the cutting device arranged on the support arm is replaced by the peeling unit.

6. A peeling and cutting tool for stripping an insulation from and peeling pre-insulated pipe ends, comprising a clamping unit for the central holding of the medium-carrying pipe end, a guide unit, wherein the guide unit is designed as a spindle and serves to provide the feed motion during the separating and peeling process, wherein the guide unit is arranged coaxially in front of the clamping unit, further comprising a support arm, a bearing assembly, a guide sleeve, wherein the support arm is mounted on a guide sleeve by means of a bearing assembly, wherein the guide sleeve is arranged on the guide unit, further including a separating unit, a cutting device and a peeling unit, wherein the cutting device and the peeling unit are arranged interchangeably on the support arm, wherein a threaded segment is arranged adjustably in the guide sleeve, said segment engaging with the spindle and bringing about a feed motion or not engaging, depending on its position.

7. The peeling and cutting device according to claim 6, wherein the threaded segment is arranged in a fixing ring, wherein the fixing ring has an eccentric recess, by means of which the threaded segment can be brought into the corresponding position.

* * * * *